United States Patent
Ikuta et al.

(10) Patent No.: US 8,896,189 B2
(45) Date of Patent: Nov. 25, 2014

(54) STATOR FOR ELECTRIC ROTATING MACHINE AND METHOD OF MANUFACTURING THE SAME

(75) Inventors: Hiroyuki Ikuta, Anjo (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 344 days.

(21) Appl. No.: 13/338,626

(22) Filed: Dec. 28, 2011

(65) Prior Publication Data

US 2012/0161566 A1 Jun. 28, 2012

(30) Foreign Application Priority Data

Dec. 28, 2010 (JP) ................................ 2010-293587

(51) Int. Cl.
*H02K 5/00* (2006.01)
(52) U.S. Cl.
USPC ............................................ 310/400; 310/89
(58) Field of Classification Search
USPC ............................................ 310/89, 400–418
See application file for complete search history.

(56) References Cited

U.S. PATENT DOCUMENTS

| 6,356,005 | B1 * | 3/2002 | Hsu ............................... | 310/425 |
| 7,183,689 | B2 * | 2/2007 | Schmidt et al. ............... | 310/419 |
| 2007/0296292 | A1 * | 12/2007 | Kienzler et al. .............. | 310/71 |
| 2009/0224626 | A1 * | 9/2009 | Eppler et al. .................. | 310/215 |
| 2010/0000075 | A1 | 1/2010 | Akimoto et al. | |

FOREIGN PATENT DOCUMENTS

| JP | P2003-176781 A | 6/2003 |
| JP | P2006-296010 A | 10/2006 |
| JP | 2007-189785 | 7/2007 |
| JP | P2009-183058 A | 8/2009 |
| JP | P2009-225504 A | 10/2009 |
| JP | 2010-017068 | 1/2010 |
| JP | 2010-178589 | 8/2010 |
| JP | 2010-226932 | 10/2010 |

OTHER PUBLICATIONS

Office Action (2 pages) dated Dec. 28, 2012 issued in corresponding Japanese Application No. 2010-293587 and English translation (1 page).

* cited by examiner

*Primary Examiner* — Thanh Lam
(74) *Attorney, Agent, or Firm* — Nixon & Vanderhye P.C.

(57) ABSTRACT

A stator for an electric rotating machine includes a hollow cylindrical stator core, a stator coil, an outer cylinder, and at least one restraint. The stator core is comprised of a plurality of stator core segments that are arranged in the circumferential direction of the stator core to adjoin one another in the circumferential direction. The stator coil is mounted on the stator core. The outer cylinder is fitted on the radially outer surfaces of the stator core segments so as to fasten the stator core segments together. The restraint is arranged on an axial side of the stator core and retained by the outer cylinder so as to restrain axial deformation of the stator core segments due to the fastening force of the outer cylinder.

11 Claims, 10 Drawing Sheets

FIG.12
(REALATED ART)

STATOR FOR ELECTRIC ROTATING MACHINE AND METHOD OF MANUFACTURING THE SAME

CROSS-REFERENCE TO RELATED APPLICATION

This application is based on and claims priority from Japanese Patent Application No. 2010-293587, filed on Dec. 28, 2010, the content of which is hereby incorporated by reference in its entirety into this application.

BACKGROUND

1. Technical Field

The present invention relates to stators for electric rotating machines that are used in, for example, motor vehicles as electric motors and electric generators, and to methods of manufacturing the stators.

2. Description of Related Art

Conventionally, there are known stators for electric rotating machines which include a hollow cylindrical stator core, a stator coil, and an outer cylinder.

The stator core is comprised of a plurality of stator core segments that are arranged in the circumferential direction of the stator core to adjoin one another in the circumferential direction. Further, to reduce iron loss of the stator core, each of the stator core segments is formed by laminating a plurality of magnetic steel sheets in the axial direction of the stator core. Moreover, the stator core has a plurality of slots that are formed in the radially inner surface of the stator core so as to be spaced from one another in the circumferential direction of the stator core. The stator coil is mounted on the stator core so as to be received in the slots of the stator core. The outer cylinder is fitted on the radially outer surfaces of the stator core segments so as to fasten them together.

Moreover, there is also known, for example from Japanese Patent Application Publication No. 2009-225504, a method of shrink-fitting the outer cylinder on the radially outer surfaces of the stator core segments. More specifically, according to the method, the inner diameter of the outer cylinder is set to be less than the outer diameter of the stator core. In the shrink-fitting process, the outer cylinder is first heated, thereby causing the inner diameter of the outer cylinder to become greater than the outer diameter of the stator core. Then, the outer cylinder is fitted onto the radially outer surfaces of the stator core segments all of which together make up the radially outer surface of the stator core. Thereafter, the outer cylinder is cooled at room temperature until the difference in temperature between the outer cylinder and the stator core segments becomes zero. As a result, the stator core segments are fixed together by means of compressive stress induced by the difference between the inner diameter of the outer cylinder and the outer diameter of the stator core.

However, with the above method, buckling of the magnetic steel sheets that are laminated to form the stator core segments may occur when there are variations in the dimensions of the magnetic steel sheets and the outer cylinder.

Figure 12:
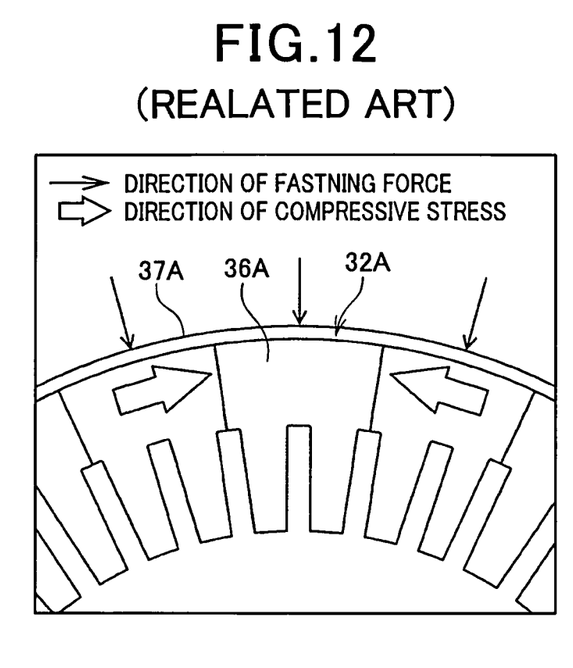
FIG. 12 is an axial end view of part of a stator according to the related art.

Specifically, referring to FIG. 12, the fastening force of the outer cylinder 37A is applied radially inward to the magnetic steel sheets 36A, inducing compressive stress in the magnetic steel sheets 36A in the circumferential direction of the stator core. When there are variations in the dimensions (e.g., diameters) of the magnetic steel sheets 36A and the outer cylinder 37A, the circumferential compressive stress induced in the magnetic steel sheets 36A may become excessively large, causing the magnetic steel sheets 36A to be buckled (or deformed) in the thickness direction thereof (i.e., in the axial direction of the stator core).

Moreover, for each of the stator core segments 32A, the magnetic steel sheets 36A which are laminated to form the stator core segment 32A may be fixed together by, for example, staking or welding. However, when buckling of the magnetic steel sheets 36A occurs, the force of fixing the magnetic steel sheets 36A together will be weakened. Consequently, in the worst cases, the buckled magnetic steel sheets 32A will be separated from the other magnetic steel sheets 32A.

To solve the above problem, one may consider increasing the number of staking spots or welding spots in the magnetic steel sheets 36A. However, with the increase in the number of the staking spots or welding spots, iron loss (or eddy-current loss) of the stator core would be increased.

SUMMARY

According to an exemplary embodiment, there is provided a stator for an electric rotating machine. The stator includes a hollow cylindrical stator core, a stator coil, an outer cylinder, and at least one restraint. The stator core is comprised of a plurality of stator core segments that are arranged in the circumferential direction of the stator core to adjoin one another in the circumferential direction. The stator coil is mounted on the stator core. The outer cylinder is fitted on the radially outer surfaces of the stator core segments so as to fasten the stator core segments together. The restraint is arranged on an axial side of the stator core and retained by the outer cylinder so as to restrain axial deformation of the stator core segments due to the fastening force of the outer cylinder.

Consequently, even when there are variations in the dimensions of the outer cylinder and the stator core segments and thus the circumferential compressive stress induced by the fastening force of the outer cylinder in the stator core segments is excessively large, it is still possible to effectively restrain, with the at least one restraint, the axial deformation of the stator core segments due to the circumferential compressive stress. As a result, it is possible to reliably prevent buckling of the magnetic steel sheets that form the stator core segments from occurring.

According to the exemplary embodiment, there is also provided a method of manufacturing a stator for an electric rotating machine. The method includes the steps of: preparing a plurality of stator core segments, a stator coil, and an outer cylinder; assembling the stator core segments to the stator coil so that the stator core segments together make up a hollow cylindrical stator core; and fitting the outer cylinder onto the radially outer surface of the stator core so as to fasten the stator core segments together. Moreover, the fitting step is performed with at least one restraint arranged on an axial side of the stator core so as to restrain axial deformation of the stator core segments due to the fastening force of the outer cylinder.

Consequently, during the fitting step, even when there are variations in the dimensions of the outer cylinder and the stator core segments and thus the circumferential compressive stress induced by the fastening force of the outer cylinder in the stator core segments is excessively large, it is still possible to effectively restrain, with the at least one restraint, the axial deformation of the stator core segments due to the circumferential compressive stress. As a result, it is possible to reliably prevent buckling of the magnetic steel sheets that form the stator core segments from occurring.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Exemplary embodiments will be described hereinafter with reference to FIGS. 1-11. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

First Embodiment

Figure 1:
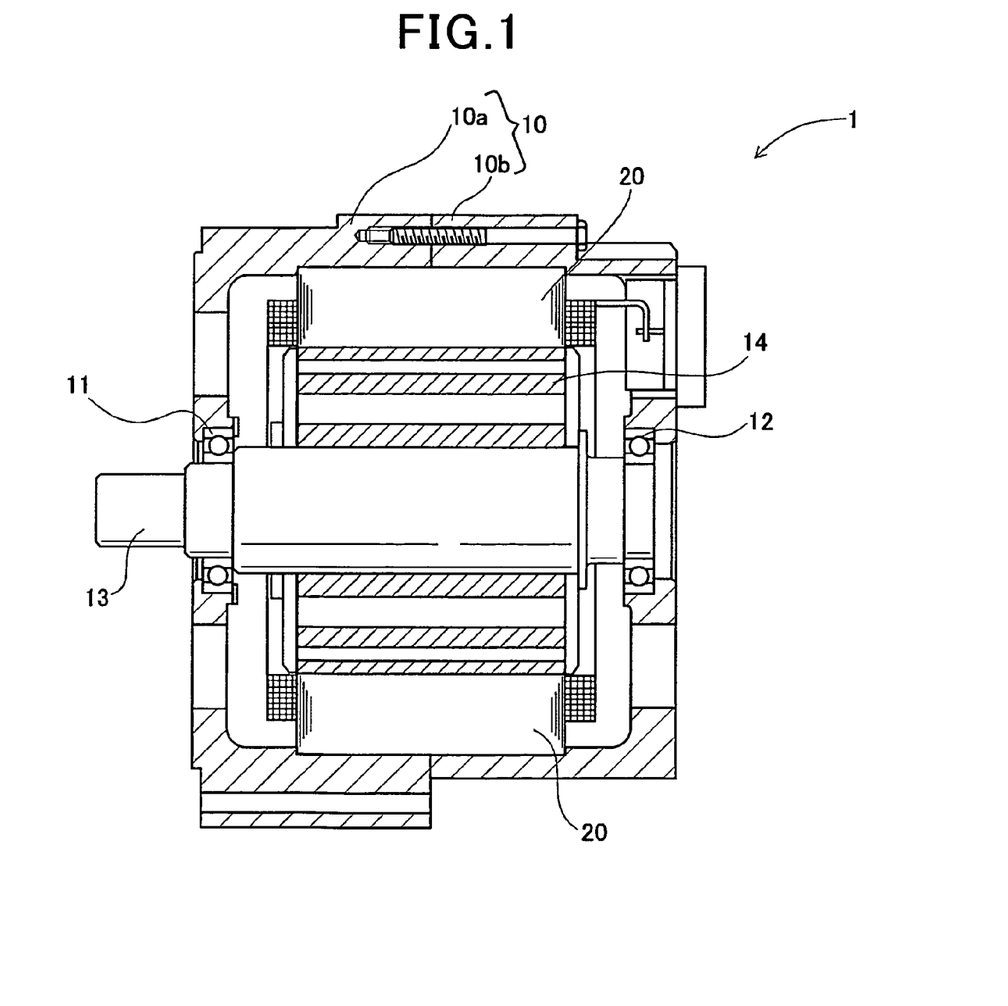
FIG. 1 is a schematic, partially cross-sectional view of an electric rotating machine which includes a stator according to a first embodiment.

FIG. 1 shows the overall configuration of an electric rotating machine 1 which includes a stator 20 according to a first embodiment.

The electric rotating machine 1 is designed to be used in a motor vehicle, such as an electric vehicle or a hybrid vehicle, and can function both as an electric motor and as an electric generator.

As shown in FIG. 1, the electric rotating machine 1 further includes a housing 10 and a rotor 14 in addition to the stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

The rotor 14 includes a plurality of permanent magnets that form a plurality of magnetic poles on the radially outer periphery of the rotor 14 to face the radially inner periphery of the stator 20. The polarities of the magnetic poles alternate between north and south in the circumferential direction of the rotor 14. The number of the magnetic poles is set according to the design specification of the electric rotating machine 1. In the present embodiment, the number of the magnetic poles is set to be equal to, for example, eight (i.e., four north poles and four south poles).

Referring now to FIGS. 2-7, the stator 20 includes a hollow cylindrical stator core 30, a three-phase stator coil 40, an outer cylinder 37, and a pair of restraints (or restraining members) 61 and 62. In addition, the stator 20 may further have insulating paper interposed between the stator core 30 and the stator coil 40.

Figure 4:
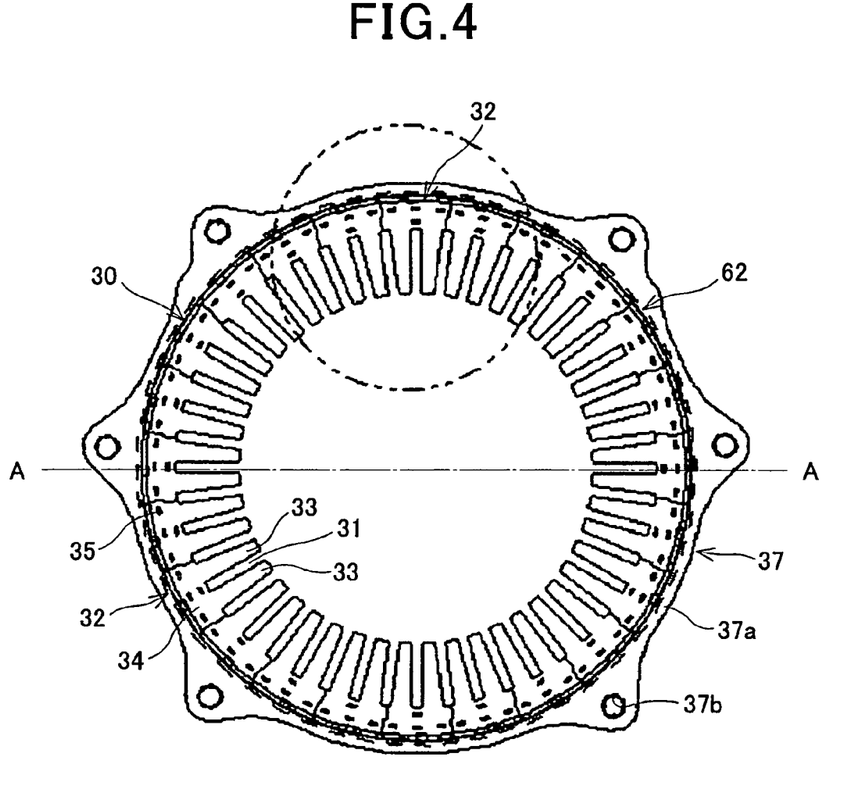
FIG. 4 is an axial end view of the stator, wherein the stator coil is omitted.

The stator core 30 has, as shown in FIG. 4, a plurality of slots 31 that are formed in the radially inner surface of the stator core 30 and spaced in the circumferential direction of the stator core 30 at predetermined intervals. For each of the slots 31, the depth direction of the slot 31 is coincident with a radial direction of the stator core 30. In the present embodiment, there are provided two slots 31 per magnetic pole of the rotor 14 that has the eight magnetic poles and per phase of the three-phase stator coil 40. Accordingly, the total number of the slots 31 formed in the stator core 30 is equal to 48 (i.e., 2×8×3).

Moreover, in the present embodiment, the stator core 30 is comprised of, for example, 24 stator core segments 32. The stator core segments 32 are arranged in the circumferential direction of the stator core 30 so as to adjoin one another in the circumferential direction.

The outer cylinder 37 has an inner diameter that is set to be less than the outer diameter of the stator core 30 by a predetermined value. The outer cylinder 37 is shrink-fitted on the radially outer surfaces of the stator core segments 32, thereby fastening the stator core segments 32 together. All the radially outer surfaces of the stator core segments 32 together make up the radially outer surface of the stator core 32.

At one axial end of the outer cylinder 37, there is formed a substantially annular flange portion 37a that protrudes radially outward from the radially outer surface of the outer cylinder 37. The flange portion 37a is obtained by bending an axial end portion of the outer cylinder 37 radially outward at substantially a right angle. Further, in the flange portion 37a, there are formed a plurality of through-holes 37b. The through-holes 37b are arranged in the circumferential direction of the outer cylinder 37 at predetermined intervals, so as to allow a plurality of fixing bolts (not shown) to respectively pass through them.

Figure 6:
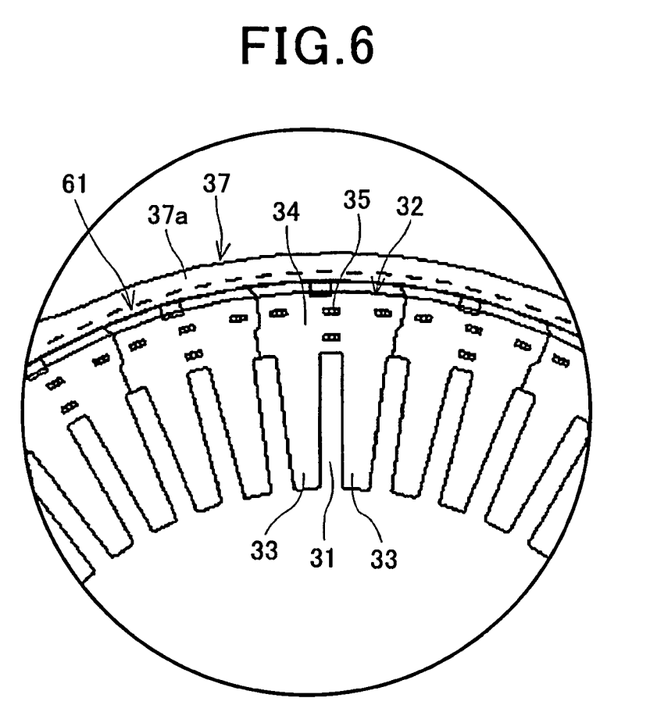
FIG. 6 is an enlarged view of that part of FIG. 4 which is circled with a dashed line.

As shown in FIG. 6, each of the stator core segments 32 defines therein one of the slots 31. Moreover, each circumferentially-adjoining pair of the stator core segments 32 together defines a further one of the slots 31 therebetween. Each of the stator core segments 32 also has two tooth portions 33, which radially extend to form the one of the slots 31 therebetween, and a back core portion 34 that is positioned radially outside of the tooth portions 33 to connect them. In addition, all the back core portions 34 of the stator core segments 32 together make up a back core portion 34 of the stator core 30.

In the present embodiment, each of the stator core segments 32 is formed by laminating a plurality of magnetic steel sheets in the axial direction of the stator core 30. The magnetic steel sheets are fixed together by, for example, staking.

More specifically, in the present embodiment, each of the magnetic steel sheets has a plurality of staking portions 35 formed therein. Each of the staking portions 35 includes a recess formed in one of the major surfaces of the magnetic steel sheet and a protrusion formed on the other major surface. In the staking process, for each adjoining pair of the magnetic steel sheets, the protrusions of the staking portions 35 of one of the magnetic steel sheets are respectively press-fitted into the recesses of the staking portions 35 of the other magnetic steel sheet.

Figure 3:
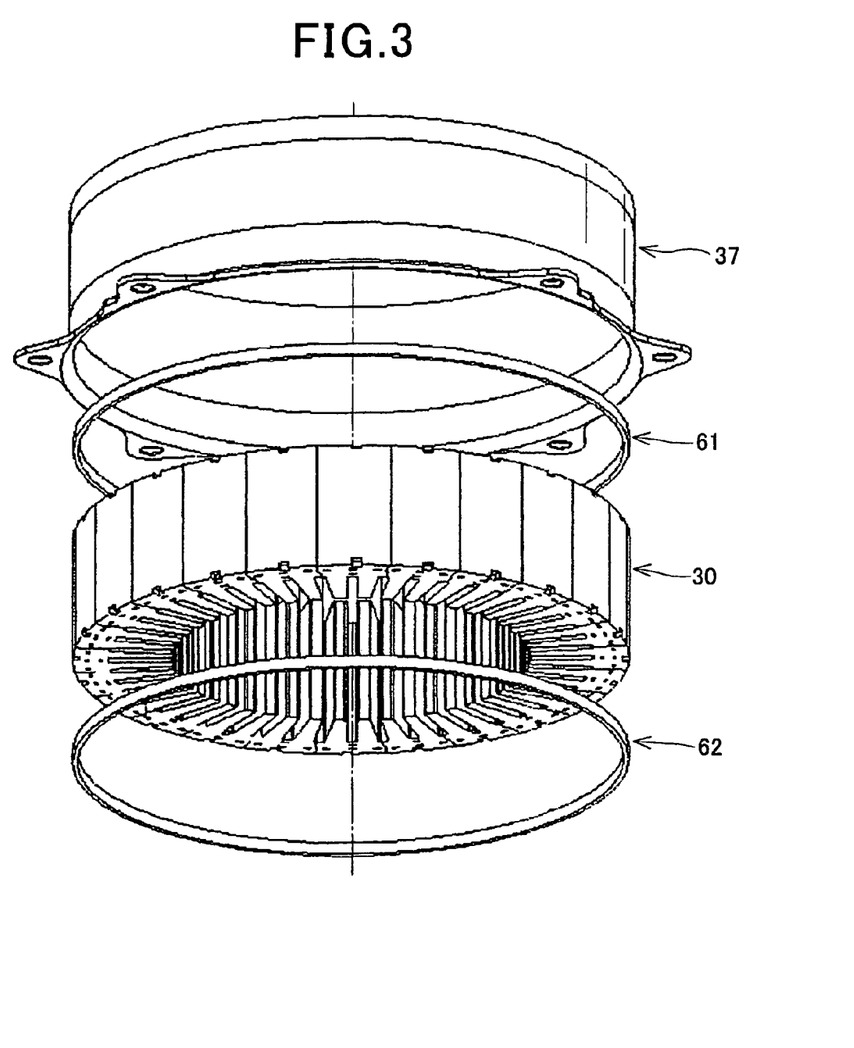
FIG. 3 is an exploded perspective view of the stator, wherein a stator coil of the stator is omitted.
Figure 5:
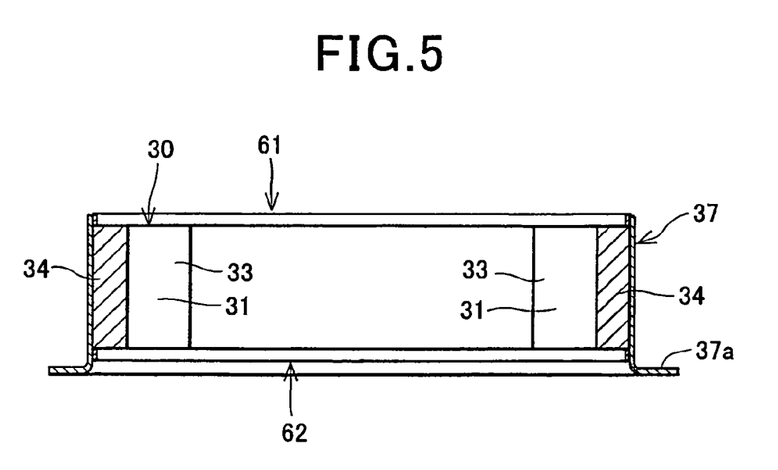
FIG. 5 is a cross-sectional view taken along the line A-A in FIG. 4.

As shown in FIGS. 3 and 5, the restraints 61 and 62 are respectively arranged on opposite axial sides of the stator core 30. Each of the restraints 61 and 62 has a substantially annular shape and is made of a nonmagnetic material, such as SUS 304 (a kind of stainless steel according to Japanese Industrial Standards), aluminum and copper. The restraints 61 and 62 have an outer diameter that is substantially equal to the outer diameter of the stator core 30. That is, the outer diameter of the restraints 61 and 62 is greater than the inner diameter of the outer cylinder 37 by the predetermined value. In addition, the restraints 61 and 62 have a radial width that is substantially equal to the thickness of the outer cylinder 37.

In the present embodiment, the outer cylinder 37 is shrink-fitted on the radially outer surfaces of the restraints 61 and 62 as well as on the radially outer surface of the stator core 30. In other words, the radially inner surface of the outer cylinder 37 is shrink-fitted to the radially outer surfaces of the stator core 30 and restraints 61 and 62.

Moreover, before the shrink-fitting of the outer cylinder 37 onto the radially outer surfaces of the stator core 30 and restraints 61 and 62, the restraints 61 and 62 are respectively joined to opposite axial end faces of the back core portion 34 of the stator core 30.

Consequently, the restraints 61 and 62 can restrain axial deformation of the stator core segments 32 due to the circumferential compressive stress that is induced in the stator core segments 32 by the fastening force of the outer cylinder 37. As a result, it is possible to prevent buckling of the magnetic steel sheets that form the stator core segments 32 from occurring.

Figure 7:
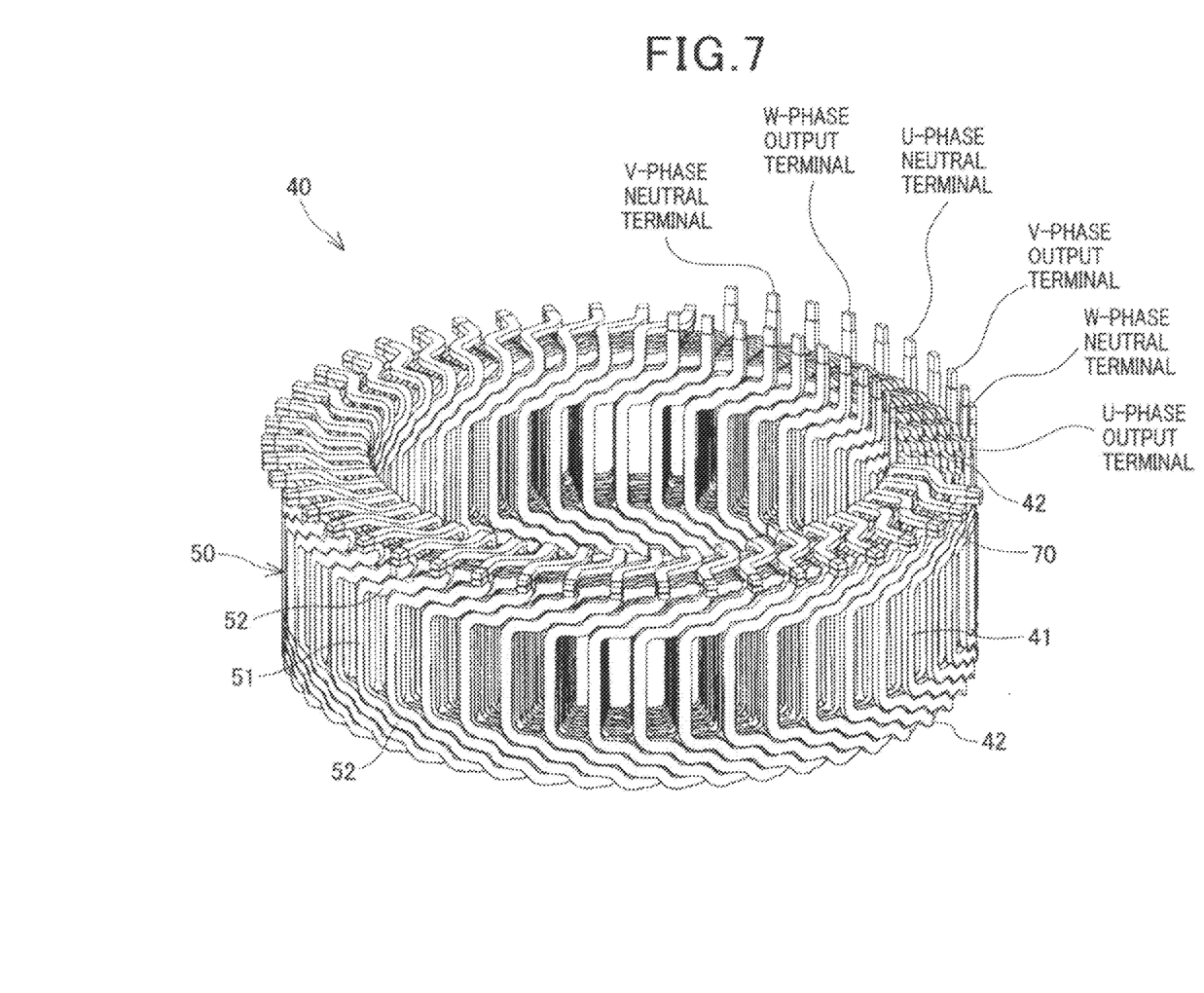
FIG. 7 is a perspective view of the stator coil of the stator.

The stator coil 40 is formed of a plurality (e.g., 12 in the present embodiment) of wave-shaped electric wires 50. As shown in FIG. 7, the stator coil 40 has, as a whole, a hollow cylindrical shape. Further, after being mounted to the stator core 30, the stator coil 40 has a straight part 41 received in the slots 31 of the stator core 30 and a pair of coil end parts 42 that are respectively formed on opposite axial sides of the straight part 41 and both located outside of the slots 31. In addition, on one axial side of the straight part 41, U-phase, V-phase and W-phase output terminals and U-phase, V-phase and W-phase neutral terminals of the stator coil 40 protrude from the annular axial end face of the coil end part 42; a plurality of crossover parts 70 of the electric wires 50 cross over the axial end face from the radially inner side to the radially outer side of the axial end face to connect corresponding pairs of the electric wires 50.

In the present embodiment, the stator coil 40 is formed by first stacking the electric wires 50 to form a flat band-shaped electric wire assembly and then rolling the flat band-shaped electric wire assembly by, for example, six turns into the hollow cylindrical shape.

Moreover, in the present embodiment, each of the electric wires 50 is configured with an electric conductor having a substantially rectangular cross section and an insulating coat that covers the outer surface of the electric conductor. Further, after being mounted to the stator core 30, each of the electric wires 50 includes a plurality of in-slot portions 51 and a plurality of turn portions 52. Each of the in-slot portions 51 is received in a corresponding one of the slots 31 of the stator core 30. Each of the turn portions 52 is located outside of the slots 31 of the stator core 30 and connects a corresponding adjacent pair of the in-slot portions 51.

Next, a method of manufacturing the stator 20 according to the present embodiment will be described with reference to FIG. 8.

Figure 8:
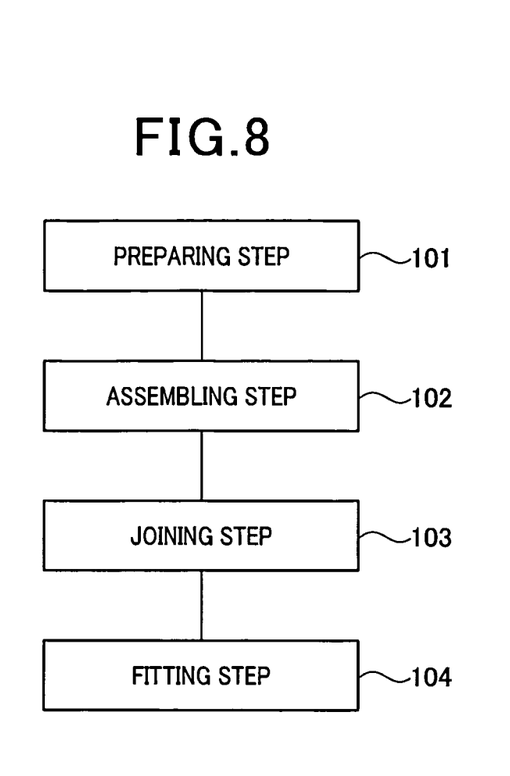
FIG. 8 is a flow chart illustrating a method of manufacturing the stator according to the first embodiment.

As shown in FIG. 8, the method according to the present embodiment includes a preparing step 101, an assembling step 102, a joining step 103, and a fitting step 104.

In the preparing step 101, the stator core segments 32 (i.e., the stator core 30), the hollow cylindrical stator coil 40 as shown in FIG. 7, the outer cylinder 37, and the restraints 61 and 62 are prepared.

In the assembling step 102, the stator core 30 is assembled to the stator coil 40.

Specifically, in this step, the tooth portions 33 of the stator core segments 32 are respectively inserted into the spaces formed between stacks of the in-slot portions 51 of the electric wires 50 from the radially outside of the stator coil 40; each of the stacks includes twelve radially-aligned in-slot portions 51 of the electric wires 50.

Consequently, after the assembling step 102, the in-slot portions 51 of the electric wires 50 are respectively received in the corresponding slots 31 of the stator core 30. More specifically, for each of the electric wires 50, each adjacent pair of the in-slot portions 51 are respectively received in a corresponding pair of the slots 31 which are separated from each other by a predetermined number (e.g., six in the present embodiment) of the slots 51. Moreover, each of the turn portions 52, which connects the corresponding adjacent pair of the in-slot portions 51, protrudes from a corresponding axial end face of the stator core 30. In addition, all the in-slot portions 51 of the electric wires 50 together make up the straight part 41 of the stator coil 40; all of those turn portions 52 of the electric wires 50 which protrude outside of the slots 31 on one axial side of the stator core 30 together make up the coil end part 42 of the stator coil 40 on the one axial side; all of those turn portions 52 of the electric wires 50 which protrude outside of the slots 31 on the other axial side of the stator core 30 together make up the coil end part 42 on the other axial side.

In the joining step 103, the restraints 61 and 62 are respectively joined to opposite axial end faces of the back core portion 34 of the stator core 30 by, for example, welding, adhesive bonding or staking.

Specifically, the restraints 61 and 62 are respectively joined to the axial end faces of the back core portion 34 of the stator core 30 so that they are substantially coaxial with the stator core 30 and the radially outer surfaces of them extend in substantially the same plane as the radially outer surface of the stator core 30.

In the fitting step 104, the outer cylinder 37 is shrink-fitted onto the radially outer surfaces of the stator core 30 and the restraints 61 and 62.

Figure 2:
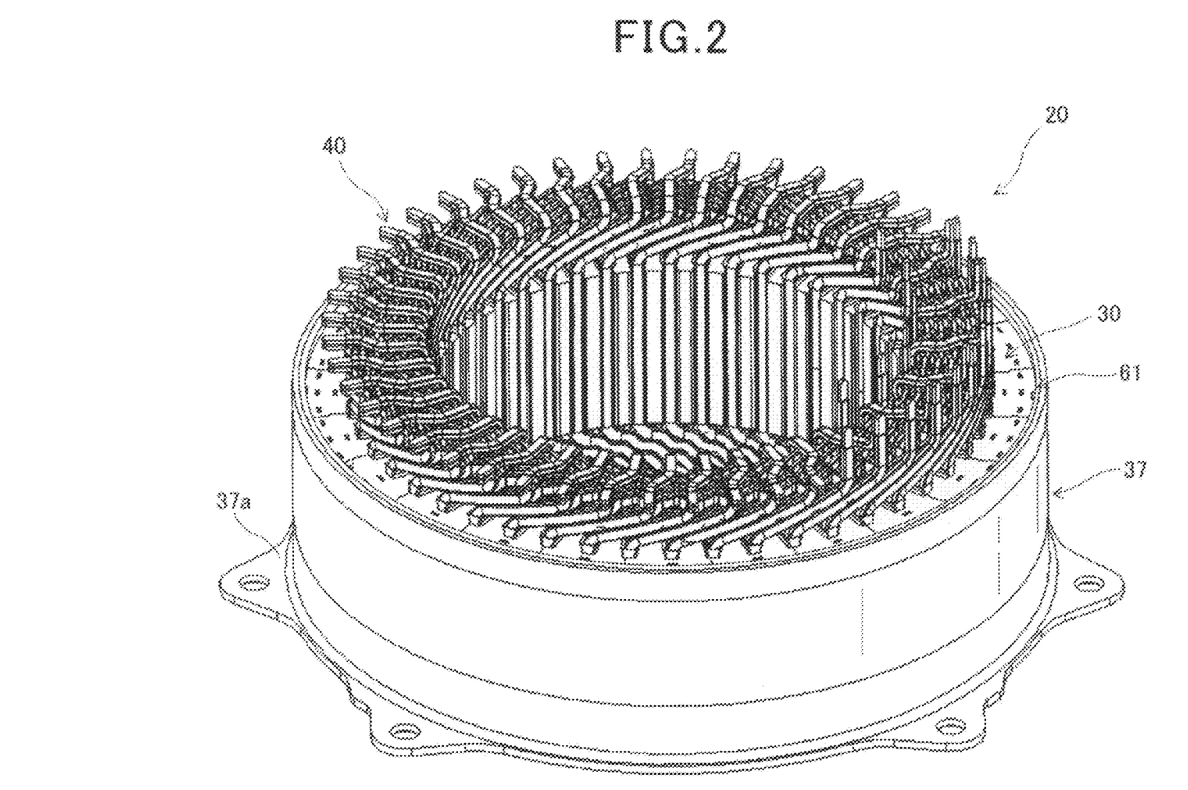
FIG. 2 is a perspective view of the stator.

Specifically, in this step, the outer cylinder 37 is first heated, thereby causing the inner diameter of the outer cylinder 37 to become greater than the outer diameters of the stator core 30 and the restraints 61 and 62. Then, the outer cylinder 37 is fitted onto the radially outer surfaces of the stator core 30 and the restraints 61 and 62. Thereafter, the outer cylinder 37 is cooled at room temperature until the difference between the temperature of the outer cylinder 37 and the temperature of the stator core 30 and the restraints 61 and 62 becomes zero. Consequently, the outer cylinder 37 is firmly fixed on the radially outer surfaces of the stator core 30 and the restraints 61 and 62, resulting in the stator 20 as shown in FIG. 2.

In the resultant stator 20, the fastening force of the outer cylinder 37, which is applied radially inward to the stator core segments 32, induces compressive stress in the stator core segments 32 in the circumferential direction of the stator core 32. Further, when there are variations in the dimensions (e.g., diameters) of the outer cylinder 37 and the magnetic steel sheets that form the stator core segments 32, the circumferential compressive stress induced in the stator core segments 32 may become excessively large. However, even in such a case, it is still possible to effectively restrain, with the restraints 61 and 62, axial deformation of the stator core segments 32 due to the circumferential compressive stress. Consequently, it is possible to reliably prevent buckling of the magnetic steel sheets that form the stator core segments 32 from occurring.

In addition, it is preferable that the restraints 61 and 62 have a higher rigidity than the magnetic steel sheets that form the stator core segments 32. With the higher rigidity, it is possible for the restraints 61 and 62 to more effectively restrain the axial deformation of the stator core segments 32, thereby more reliably preventing buckling of the magnetic steel sheets from occurring.

According to the present embodiment, it is possible to achieve the following advantages.

In the present embodiment, the stator 20 includes the hollow cylindrical stator core 30, the stator coil 40 mounted on the stator core 30, the outer cylinder 37, and the restraints 61 and 62. The stator core 30 is comprised of the stator core segments 32 that are arranged in the circumferential direction of the stator core 30 to adjoin one another in the circumferential direction. The stator coil 40 is mounted on the stator core 30. The outer cylinder 37 is fitted on the radially outer surfaces of the stator core segments 32 so as to fasten the stator core segments 32 together. The restraints 61 and 62 are respectively arranged on opposite axial sides of the stator core 30 and retained by the outer cylinder 37 so as to restrain axial deformation of the stator core segments 32 due to the fastening force of the outer cylinder 37.

Consequently, even when there are variations in the dimensions of the outer cylinder 37 and the stator core segments 32 and thus the circumferential compressive stress induced by the fastening force of the outer cylinder 37 in the stator core segments 32 is excessively large, it is still possible to effectively restrain, with the restraints 61 and 62, the axial deformation of the stator core segments 32 due to the circumferential compressive stress. As a result, it is possible to reliably prevent buckling of the magnetic steel sheets that form the stator core segments 32 from occurring.

In addition, since buckling of the magnetic steel sheets can be prevented by the restraints 61 and 62, it is possible to minimize the number of the staking portions 35 provided in the magnetic steel sheets, thereby improving the magnetic characteristics of the stator core 30 and thus the efficiency of the electric rotating machine 1.

Moreover, in the present embodiment, the stator 20 includes the pair of restraints 61 and 62 that are respectively arranged on opposite axial sides of the stator core 30.

Consequently, compared to a case where the stator 20 includes only a single restraint arranged on one axial side of the stator core 30, it is possible to more reliably prevent buckling of the magnetic steel sheets from occurring.

In the present embodiment, each of the restraints 61 and 62 is configured to have the substantially annular shape.

Consequently, with the substantially annular shape, it is possible for the restraints 61 and 62 to effectively prevent axial deformation of the stator core segments 32 over the entire circumference of the stator core 30. As a result, it is possible for the restraints 61 and 62 to reliably prevent, for each of the stator core segments 32, buckling of the magnetic steel sheets that form the stator core segment 32.

In the present embodiment, the restraints 61 and 62 are respectively joined to opposite axial end faces of the back core portion 34 of the stator core 30. That is, the restraints 61 and 62 are positioned radially outside of the slots 31 of the stator core 30.

It should be noted that the fastening force of the outer cylinder 37 induces the circumferential compressive stress mostly in the back core portion 34 of the stator core 30. Therefore, by positioning the restraints 61 and 62 as above, it is possible to more effectively restrain the axial deformation of the stator core segments 32 due to the circumferential compressive stress. In addition, with the above positioning of the restraints 61 and 62, it is also possible to reliably prevent the restraints 61 and 62 from interfering with the stator coil 40.

In the present embodiment, each of the restraints 61 and 62 is made of a nonmagnetic material.

Consequently, it is possible to minimize the influence of the restraints 61 and 62 on magnetic paths formed in the stator core 30.

In the present embodiment, the outer cylinder 37 is also shrink-fitted on the radially outer surfaces of the restraints 61 and 62.

Consequently, the restraints 61 and 62 can be easily retained by the outer cylinder 37 without employing any additional retaining means.

In the present embodiment, the outer cylinder 37 is shrink-fitted on the radially outer surfaces of the stator core segments 32 and restraints 61 and 62.

Consequently, compared to a case where the outer cylinder 37 is press-fitted on the radially outer surfaces of the stator core segments 32 and restraints 61 and 62, it is possible for the outer cylinder 37 to more firmly fasten the stator core segments 32 together and more reliably retain the restraints 61 and 62.

In the present embodiment, the restraints 61 and 62 are respectively joined to the axial end faces of the stator core 30.

Consequently, compared to a case where the restraints 61 and 62 are not joined to the axial end faces of the stator core 30, it is possible to more effectively restrain the axial deformation of the stator core segments 32, thereby more effectively prevent buckling of the magnetic steel sheets from occurring.

In the present embodiment, the method of manufacturing the stator 20 includes the preparing step 101, the assembling step 102, and the fitting step 104. In the preparing step 101, the stator core segments 32, the hollow cylindrical stator coil 40, the outer cylinder 37, and the restraints 61 and 62 are prepared. In the assembling step 102, the stator core segments 32 are assembled to the stator coil 40 so that the stator core segments 32 together make up the stator core 30. In the fitting step 104, the outer cylinder 37 is shrink-fitted onto the radially outer surface of the stator core 30 so as to fasten the stator core segments 32 together. Further, the fitting step 104 is performed with the restraints 61 and 62 respectively arranged on opposite axial sides of the stator core 30.

Consequently, during the fitting step 104, even when there are variations in the dimensions of the outer cylinder 37 and the stator core segments 32 and thus the circumferential compressive stress induced by the fastening force of the outer cylinder 37 in the stator core segments 32 is excessively large, it is still possible to effectively restrain, with the restraints 61 and 62, the axial deformation of the stator core segments 32 due to the circumferential compressive stress. As a result, it is possible to reliably prevent buckling of the magnetic steel sheets that form the stator core segments 32 from occurring.

Moreover, in the present embodiment, in the fitting step 104, the outer cylinder 37 is shrink-fitted onto the radially outer surfaces of the restraints 61 and 62 as well as onto the radially outer surface of the stator core 30.

Consequently, it is possible for the outer cylinder 37 to perform both the function of fastening the stator core segments 32 together and the function of retaining the restraints 61 and 62 at the same time. As a result, it is possible to easily retain the restraints 61 and 62 without employing any additional retaining means.

In the present embodiment, the method of manufacturing the stator 20 further includes the joining step 103 before the fitting step 104. In the joining step 103, the restraints 61 and 62 are respectively joined to opposite axial end faces of the back core portion 34 of the stator core 30.

Consequently, in the subsequent fitting step 104, with the restraints 61 and 62 having been joined to the stator core 30, it is possible to easily shrink-fit the outer cylinder 37 on the radially surfaces of the restraints 61 and 62 as well as on the radially outer surface of the stator core 30.

Second Embodiment

This embodiment illustrates a stator 20 which has almost the same structure as the stator 20 according to the first embodiment; accordingly, only the differences therebetween will be described hereinafter.

In the first embodiment, the stator 20 includes the pair of restraints 61 and 62 each of which is formed as an independent part and assembled into the stator 20. More specifically, the restraints 61 and 62 are respectively joined to the axial end faces of the stator core 30 and both shrink-fitted to the outer cylinder 37.

Figure 9:
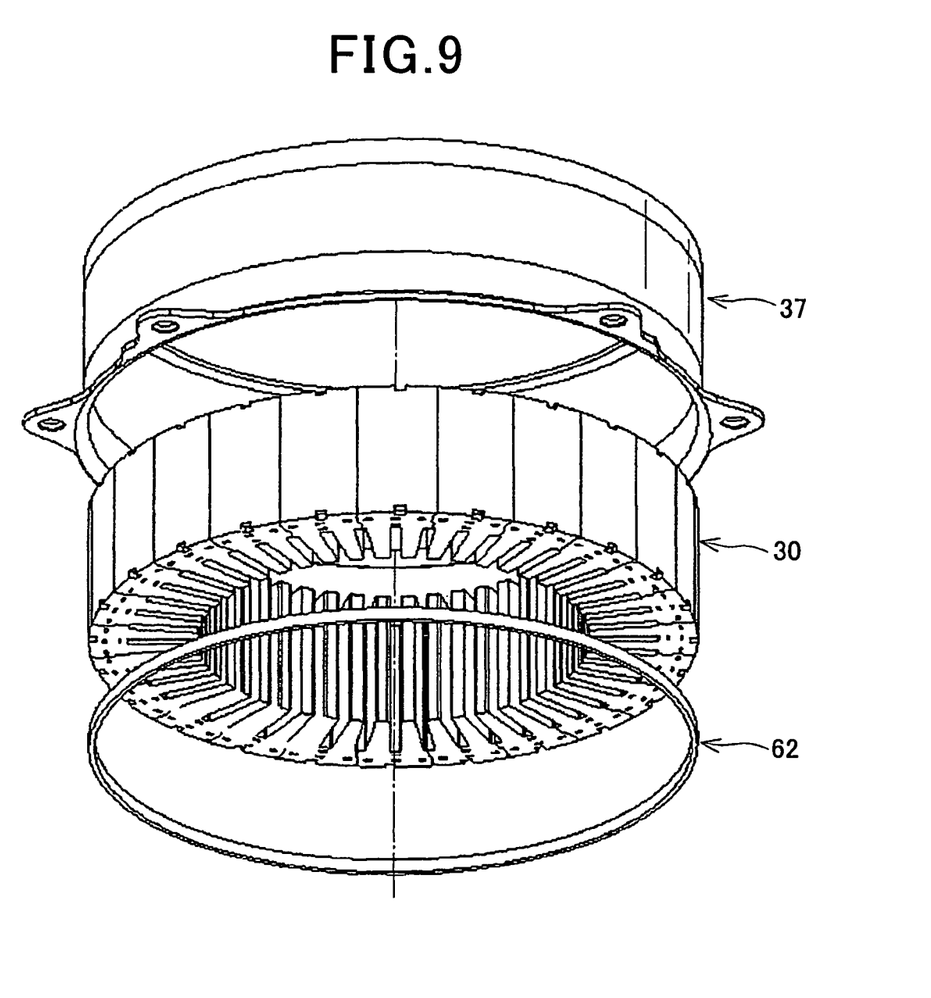
FIG. 9 is an exploded perspective view of a stator according to a second embodiment, wherein a stator coil of the stator is omitted.
Figure 10:
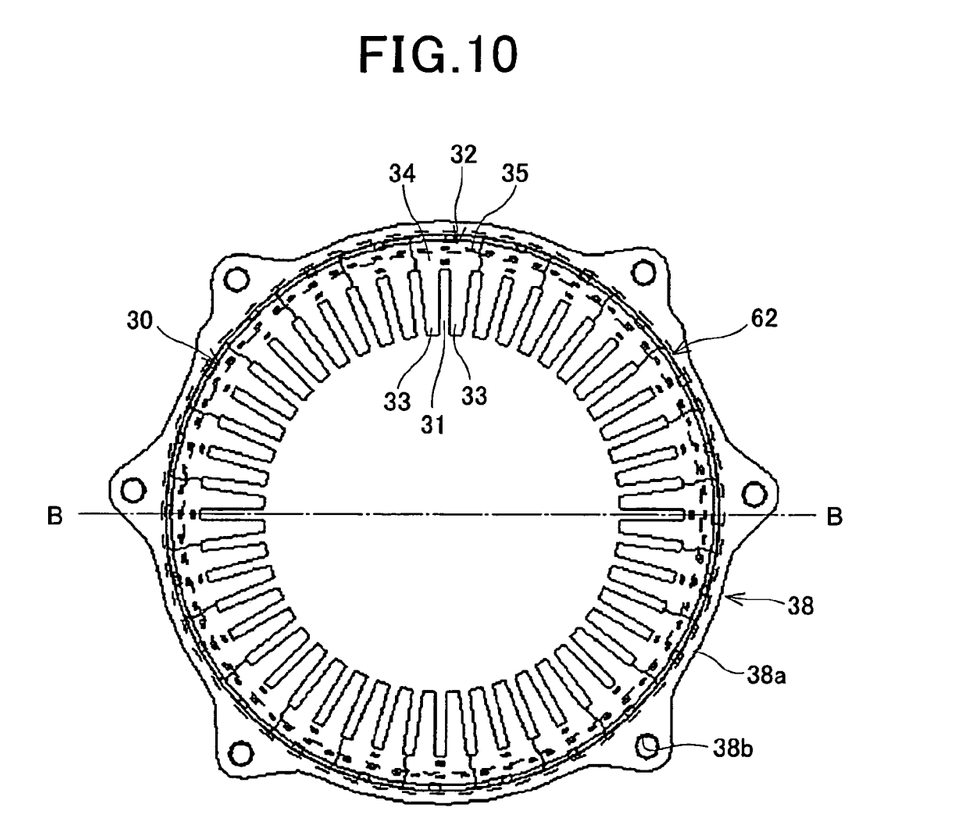
FIG. 10 is an axial end view of the stator according to the second embodiment, wherein the stator coil is omitted.
Figure 11:
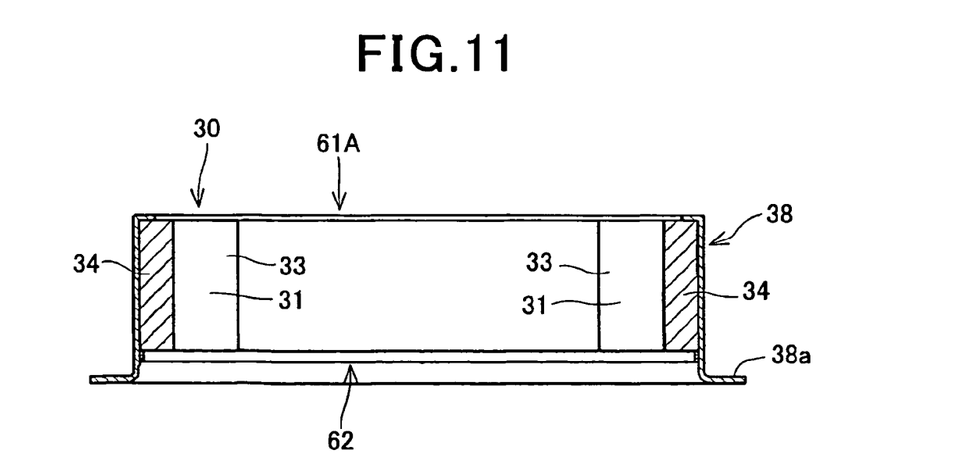
FIG. 11 is a cross-sectional view taken along the line B-B in FIG. 10.

In comparison, in the present embodiment, as shown in FIGS. 9-11, the stator 20 includes a pair of restraints 61A and 62 that are respectively arranged on opposite axial sides of the stator core 30. Further, the stator 20 includes an outer cylinder 38 instead of the outer cylinder 37 in the first embodiment.

The restraint 62 is identical to that in the first embodiment. That is, the restraint 62 is formed as an independent part, joined to one of the axial end faces of the stator core 30, and shrink-fitted to the outer cylinder 38.

On the other hand, the restraint 61A is different from the restraint 61 in the first embodiment. Specifically, the restraint 61A is formed as an integral part of the outer cylinder 38, but not joined to the axial end faces of the stator core 30.

More specifically, in the present embodiment, the outer cylinder 38 has a substantially annular flange portion 38a that is formed at one axial end of the outer cylinder 38 to protrude radially outward from the radially outer surface of the outer cylinder 38. Further, in the flange portion 38a, there are formed a plurality of through-holes 38b. The through-holes 38b are arranged in the circumferential direction of the outer cylinder 38 at predetermined intervals, so as to allow a plurality of fixing bolts (not shown) to respectively pass through them. The outer cylinder 38 also has a substantially annular protrusion 61A that is formed at the other axial end of the outer cylinder 38 so as to protrude radially inward from the radially inner surface of the outer cylinder 38. The protrusion 61A functions as a restraint on the other axial side of the stator core 30 to restrain axial deformation of the stator core segments 32.

In addition, in the present embodiment, the flange portion 38a is obtained by bending one axial end portion of the outer cylinder 38 radially outward at substantially a right angle. On the other hand, the protrusion 61A is obtained by bending the other axial end portion of the outer cylinder 38 radially inward at substantially a right angle.

Moreover, the radially inner end of the protrusion 61A of the outer cylinder 38 is located at substantially the same radial position as the radial center of the back core portion 34 of the stator core 30. That is, the radial width of the protrusion 61A is substantially half the radial width of the back core portion 34 of the stator core 30. In addition, the radial width of the protrusion 61A is several times greater than that of the restraint 62.

Furthermore, in the present embodiment, in the joining step 103, only the restraint 62 is joined to one of the axial end faces of the back core portion 34 of the stator core 30 by, for example, welding, adhesive bonding or staking. More specifically, the restraint 62 is joined to the axial end face of the back core portion 34 of the stator core 30 so that it is substantially coaxial with the stator core 30 and its radially outer surface extends in substantially the same plane as the radially outer surface of the stator core 30.

In the subsequent fitting step 104, the outer cylinder 38 is shrink-fitted onto the radially outer surfaces of the stator core 30 and the restraint 62, so that the restraint 61A (i.e., the protrusion 61A of the outer cylinder 38) is brought into contact (or pressed-contact) with the other axial end face of the back core portion 34 of the stator core 30.

The above-described stator 20 according to the present embodiment has the same advantages as the stator 20 according to the first embodiment.

In addition, in the present embodiment, with the integral formation of the restraint 61A with the outer cylinder 38, it is possible to reduce the parts count of the stator 20 and facilitate the shrink-fitting process in the fitting step 104.

While the above particular embodiments have been shown and described, it will be understood by those skilled in the art that various modifications, changes, and improvements may be made without departing from the spirit of the invention.

For example, in the previous embodiments, the outer cylinder 37 is shrink-fitted on the radially outer surfaces of the stator core segments 32.

However, the outer cylinder 37 may also be press-fitted on the radially outer surfaces of the stator core segments 32 so as to fasten the stator core segments 32 together.

In the first embodiment, the stator 20 includes the pair of restraints 61 and 62 respectively arranged on opposite axial sides of the stator core 30. However, it is also possible to omit one of the restraints 61 and 62 from the stator 20. In other words, the stator 20 may also include only a single restraint arranged on one axial side of the stator core 30.

In the firs embodiment, the restraints 61 and 62 are respectively joined to the axial end faces of the back core portion 34 of the stator core 30. However, the restraints 61 and 62 may also be respectively arranged in contact with (or in pressed-contact with) the axial end faces of the back core portion 34 of the stator core 30, without being joined to the axial end faces.

Furthermore, either or both of the restraints 61 and 62 may also be joined to the outer cylinder 37 instead of the axial end faces of the back core portion 34 of the stator core 30.

What is claimed is:
1. A stator for an electric rotating machine, the stator comprising:
    a hollow cylindrical stator core comprised of a plurality of stator core segments that are arranged in a circumferential direction of the stator core to adjoin one another in the circumferential direction;
    a stator coil mounted on the stator core;

an outer cylinder that is fitted on radially outer surfaces of the stator core segments so as to fasten the stator core segments together; and at least one restraint that is arranged on an axial side of the stator core and retained by the outer cylinder so as to restrain axial deformation of the stator core segments due to a fastening force of the outer cylinder.

2. The stator as set forth in claim 1, wherein the at least one restraint comprises a pair of restraints that are respectively arranged on opposite axial sides of the stator core.

3. The stator as set forth in claim 1, wherein the at least one restraint has a substantially annular shape.

4. The stator as set forth in claim 1, wherein the stator core has a plurality of slots that are formed in a radially inner surface of the stator core so as to be spaced from one another in the circumferential direction of the stator core, and the at least one restraint is positioned radially outside of the slots of the stator core.

5. The stator as set forth in claim 1, wherein the at least one restraint is made of a nonmagnetic material.

6. The stator as set forth in claim 1, wherein the at least one restraint has a radially outer surface on which the outer cylinder is also fitted.

7. The stator as set forth in claim 6, wherein the outer cylinder is shrink-fitted on the radially outer surfaces of the stator core segments and the radially outer surface of the at least one restraint.

8. The stator as set forth in claim 1, wherein the outer cylinder is shrink-fitted on the radially outer surfaces of the stator core segments.

9. The stator as set forth in claim 1, wherein the at least one restraint is joined to an axial end face of the stator core.

10. The stator as set forth in claim 1, wherein the outer cylinder has a protrusion that is formed at an axial end of the outer cylinder to protrude radially inward from a radially inner surface of the outer cylinder, and the at least one restraint is made up of the protrusion of the outer cylinder.

11. The stator as set forth in claim 1, wherein the at least one restraint is joined to the outer cylinder.

* * * * *